United States Patent
Larkin

(10) Patent No.: US 10,452,167 B2
(45) Date of Patent: Oct. 22, 2019

(54) MOTION CONTROL DEVICE FOR INTERFACING WITH A COMPUTING DEVICE

(71) Applicant: Edward F. Larkin, Hallowell, ME (US)

(72) Inventor: Edward F. Larkin, Hallowell, ME (US)

( * ) Notice: Subject to any disclaimer, the term of this patent is extended or adjusted under 35 U.S.C. 154(b) by 0 days.

(21) Appl. No.: 15/991,434

(22) Filed: May 29, 2018

(65) Prior Publication Data

US 2018/0341340 A1    Nov. 29, 2018

Related U.S. Application Data

(60) Provisional application No. 62/603,362, filed on May 26, 2017.

(51) Int. Cl.
| | |
|---|---|
| *G06F 3/038* | (2013.01) |
| *G06F 1/16* | (2006.01) |
| *G06F 3/0354* | (2013.01) |
| *G06F 3/0338* | (2013.01) |
| *G06F 3/0362* | (2013.01) |

(52) U.S. Cl.
CPC ............. *G06F 3/038* (2013.01); *G06F 1/169* (2013.01); *G06F 3/0338* (2013.01); *G06F 3/0354* (2013.01); *G06F 3/0362* (2013.01); *G06F 3/0383* (2013.01)

(58) Field of Classification Search
CPC ...... G06F 3/038; G06F 3/0338; G06F 3/0354; G06F 3/0362; G06F 3/0383; G06F 1/169
See application file for complete search history.

(56) References Cited

U.S. PATENT DOCUMENTS

| | | | | |
|---|---|---|---|---|
| 8,186,240 B2* | 5/2012 | Sakai | ..................... | A43B 21/42 |
| | | | | 200/6 A |
| 8,487,872 B2* | 7/2013 | McAlindon | ........... | G06F 3/0235 |
| | | | | 345/161 |
| 8,770,056 B2* | 7/2014 | Terao | ................... | G06F 3/0338 |
| | | | | 335/205 |
| 8,912,457 B2* | 12/2014 | Tseng | .................... | G06F 3/0488 |
| | | | | 200/336 |
| 9,691,563 B2* | 6/2017 | Okazaki | ................ | G06F 3/0338 |
| 2006/0125785 A1* | 6/2006 | McAlindon | ........... | G06F 3/0235 |
| | | | | 345/156 |

(Continued)

*Primary Examiner* — Peter D McLoone

(57) ABSTRACT

A motion control device for interfacing with a computing device translates user interaction into an input signal to manipulate the output of the computing device. The motion control device includes a protective housing, a wheel-mounting extrusion, a rotary wheel, a primary joystick, at least one thumbstick, a plurality of programmable buttons, and a microcontroller. The protective housing supports the wheel-mounting extrusion, the primary joystick, and the at least one thumbstick. The rotary wheel is rotatably connected to the wheel-mounting extrusion. The microcontroller is enclosed within the protective housing. The rotary wheel, the primary joystick, and the at least one thumbstick are electronically connected to the microcontroller. The manipulation of the rotary wheel, the primary joystick, and the at least one thumbstick is translated into an input signal that is communicated to the computing device through the microcontroller.

14 Claims, 8 Drawing Sheets

(56) References Cited

U.S. PATENT DOCUMENTS

| | | | | |
|---|---|---|---|---|
| 2008/0055241 A1* | 3/2008 | Goldenberg | ............ | G06F 3/016 345/156 |
| 2009/0084214 A1* | 4/2009 | Sakai | .................... | A43B 21/42 74/471 XY |
| 2012/0260760 A1* | 10/2012 | Terao | .................... | G05G 9/047 74/471 XY |
| 2014/0042004 A1* | 2/2014 | Tseng | .................... | G06F 3/0488 200/336 |
| 2015/0279580 A1* | 10/2015 | Okazaki | ............... | G06F 3/0338 200/4 |

* cited by examiner

MOTION CONTROL DEVICE FOR INTERFACING WITH A COMPUTING DEVICE

The current application claims a priority to the U.S. Provisional Patent application Ser. No. 62/603,362 filed on May 26, 2017. The current application is filed on the next business day, which is May 29, 2018, while May 26, 2018 was on a weekend and May 28, 2018 was on a national holiday (Memorial Day).

FIELD OF THE INVENTION

The present invention relates generally to a peripheral device for computers. More specifically, the present invention relates to a motion control device for computer interfacing.

BACKGROUND OF THE INVENTION

Traditionally, users interface with a computing device using an input device to translate actions from the user into an input signal to be processed by the computing device. These input signals allow the user to signal intended actions for the computer to take in order to produce a desired output. Common input devices include a computer mouse and keyboard for the user to select specific locations displayed to them and input text, respectively. While these input devices are effective, these input devices may not be the most intuitive or comfortable for the user to implement.

An objective of the present invention is to provide an input device that is comfortable to use, intuitive, and efficient for the user to input process signals to a computing device. The present invention is a motion control device for interfacing with a computing device. The present invention allows the user to access a plurality of inputs without significant spatial translation of the user's hand to increase the user's response time. The present invention implements a plurality of buttons, a primary joystick, at least one thumbstick, and a rotary wheel in order to respectfully execute a plurality of computer macros, instructions that expands automatically into a set of instructions to perform a particular task. The plurality of button, the primary joystick, the at least one thumbstick, and the rotary wheel are positioned within the width of and ergonomically for an average human hand in order for the user to efficiently interact with the present invention. The present invention is intended to provide a user with quicker inputs while playing videogames, engaging in driving simulators, or robotic control then the user would have with a traditional keyboard.

DETAIL DESCRIPTIONS OF THE INVENTION

All illustrations of the drawings are for the purpose of describing selected versions of the present invention and are not intended to limit the scope of the present invention.

The present invention is a motion control device for interfacing with a computing device. The present invention is an input device that provides the user with access to a plurality of executable macros. The plurality of executable macros is a set of programmed command signals to send to the computing device based on the user's interaction with the present invention for the desired output by the computing device. The plurality of executable macros is manageable by the user through software to map and remap macros to specific combinations of user inputs, in accordance to the user's preference. Each macro is a single instruction that expands into a set of instructions to perform the user intended task.

Figure 1:
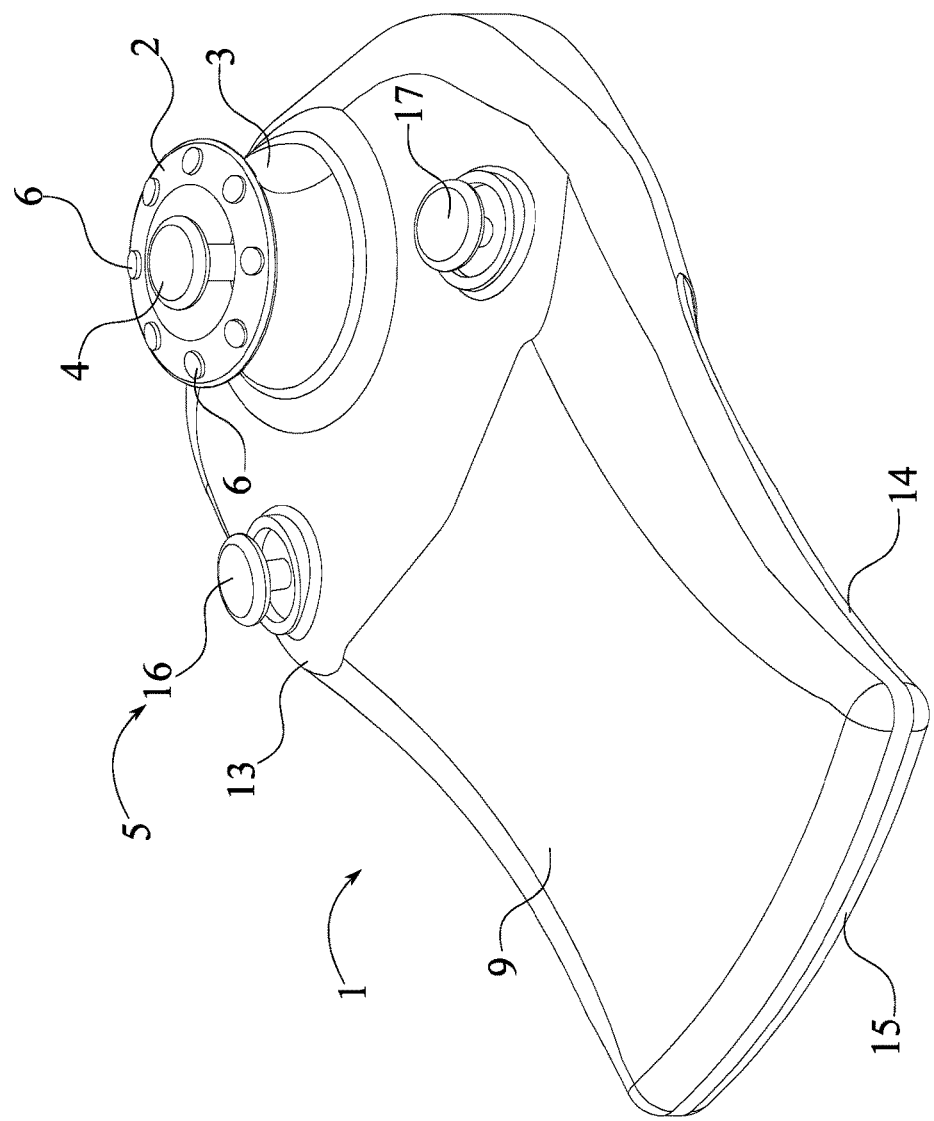
FIG. 1 is a perspective view of the present invention.
Figure 8:
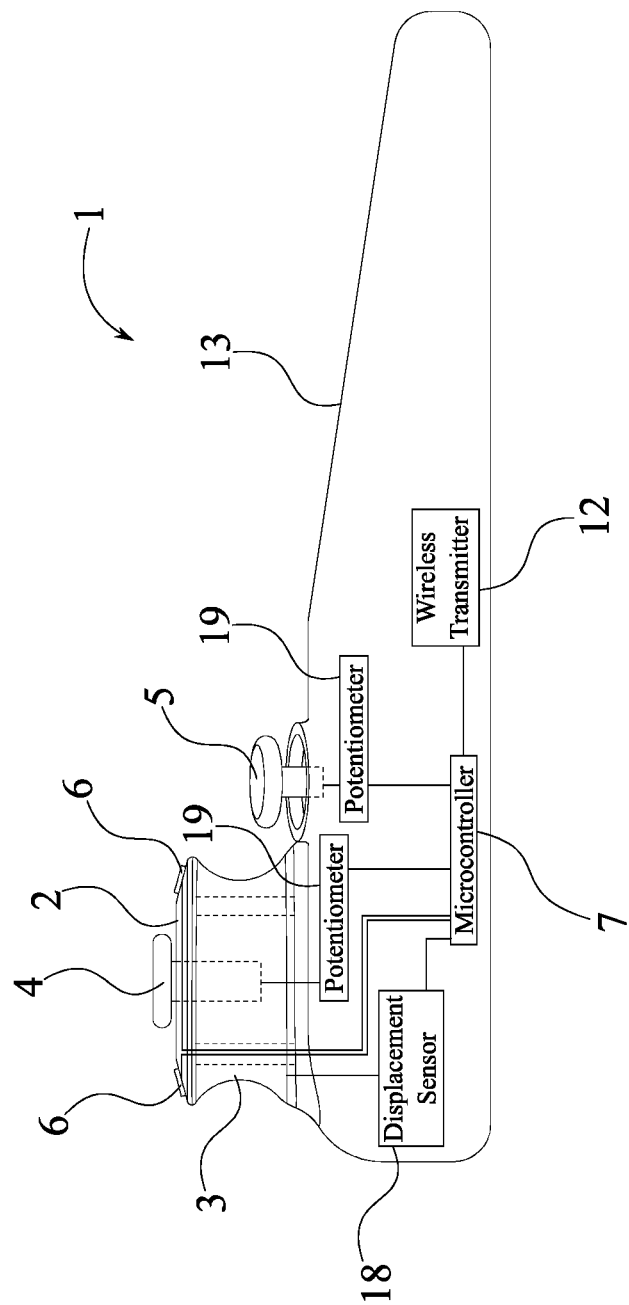
FIG. 8 is a schematic view of the present invention, wherein the present invention comprises a wireless transceiver.

In accordance to FIG. 1, the present invention comprises a protective housing 1, a wheel-mounting extrusion 2, a rotary wheel 3, a primary joystick 4, at least one thumbstick 5, a plurality of programmable buttons 6, and a microcontroller 7, shown in FIG. 8. The protective housing 1 supports the wheel-mounting extrusion 2, the primary joystick 4, and the at least one thumbstick 5, as well as protecting the electrical components of the present invention. The protective housing 1 comprises an interface surface 13, a base surface 14, and a lateral wall 15, detailed in FIG. 1 and FIG. 3 to FIG. 5. The interface surface 13 is the adjacent surface to the rotary wheel 3, the primary joystick 4, the at least one thumbstick 5, and the plurality of programmable buttons 6, as the users interacts with the present invention. The base surface 14 supports the present invention on a horizontal support, such as a table or desk. The interface surface 13 is oppositely positioned with the base surface 14 about the lateral wall 15, such that the lateral wall 15 encloses the protective housing 1 between the interface surface 13 and the base surface 14.

The wheel-mounting extrusion 2 supports the rotary wheel 3 and the plurality of programmable buttons 6. The rotary wheel 3 allows the user to have precise control for inputs that correlate well with tasks involving 360-degree revolution, such as steering a vehicle in a vehicle simulation program, or linear translation, such as scrolling to pan images or text displayed to the user. The wheel-mounting extrusion 2 is externally connected to the interface surface 13. The wheel-mounting extrusion 2 is oriented away from the base surface 14 to allow the user to effectively interact with the rotary wheel 3, shown in FIG. 3 to FIG. 6. The rotary wheel 3 extrusion is positioned around the wheel-mounting extrusion 2. The rotary wheel 3 is rotatably connected about the wheel-mounting extrusion 2, such that the user is able to revolve the rotary wheel 3 about the wheel-mounting extrusion 2.

In accordance to FIG. 1 to FIG. 8, the primary joystick 4 and the at least one thumbstick 5 provide the user with input in two dimensions. The primary joystick 4 is pivotably and centrally connected to the wheel-mounting extrusion 2. The primary joystick 4 is positioned within the wheel-mounting extrusion 2, detailed FIG. 1 and FIG. 2. The primary joystick 4 is oppositely oriented to the base surface 14, shown in FIG. 3. In a neutral position, the primary joystick 4 is concentrically positioned with the wheel-mounting extrusion 2 to allow a full range of motion of the primary joystick 4 bounded by the wheel-mounting extrusion 2, shown in FIG. 2. The at least one thumbstick 5 is pivotably connected to the protective housing 1. The at least one thumbstick 5 traverses through the interface surface 13, shown in FIG. 7 and FIG. 8. The at least one thumbstick 5 is radially offset from the rotary wheel 3. The at least one thumbstick 5 is preferred to be oriented away from the base surface 14, shown in FIG. 3 to FIG. 6. In this configuration, the user is able to effectively manipulate the at least one thumbstick 5 simultaneously with the primary joystick 4 or the rotary wheel 3.

The plurality of programmable buttons 6 allows the user to toggle the input from the primary joystick 4 between respective subsets of macros of the plurality of macros associated with each programmable button of the plurality of programmable buttons 6, expanding the possible inputs with the primary joystick 4. In accordance to FIG. 2, the plurality of programmable buttons 6 is pressably mounted to the wheel-mounting extrusion 2, such that each programmable button is able to be depressed by the user to generate an input signal. The plurality of programmable buttons 6 is oppositely positioned to the interface surface 13, along the wheel-mounting extrusion 2. The plurality of programmable buttons 6 is preferred to be evenly distributed about the wheel-mounting housing to reduce the possibility of the user depressing more than one programmable button at a time. When a programmable button of the plurality of programmable buttons 6 is depressed, a respective set of macros from the plurality of macros is assigned to regional positions of the primary joystick 4.

Figure 7:
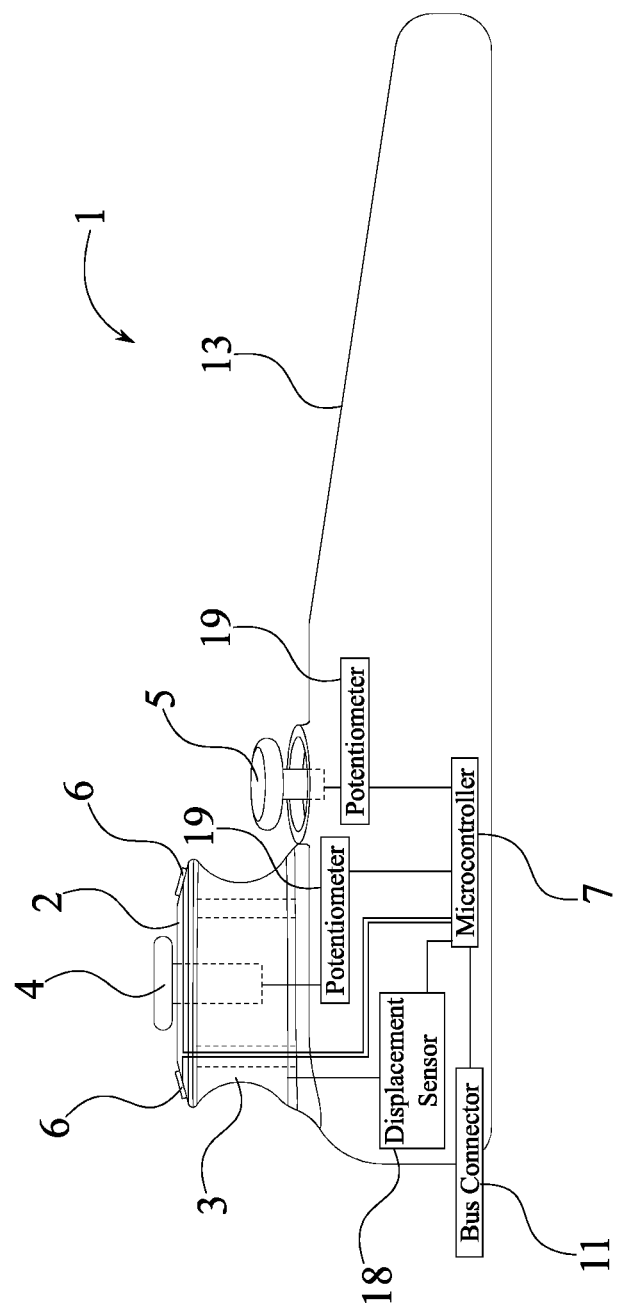
FIG. 7 is schematic view of the present invention, wherein the present invention comprises a bus connector.

In accordance to FIG. 7 and FIG. 8, the microcontroller 7 receives inputs from the rotary wheel 3, the primary joystick 4, the at least one thumbstick 5, and the plurality of programmable buttons 6 to communicate the respective user inputs to the computing device. The microcontroller 7 stores the assignment for plurality of macros for the respective user input to translate the user input into the corresponding input signal for the computing device. The microcontroller 7 is internally mounted within the protective housing 1. The rotary wheel 3, the primary joystick 4, the at least one thumbstick 5, and the plurality of programmable buttons 6 are electronically connected to the microcontroller 7 such that the microcontroller 7 can process the respective inputs from the rotary wheel 3, the primary joystick 4, the at least one thumbstick 5, and the plurality of programmable buttons 6 to the computing device.

More specifically, the rotary wheel 3 is electronically connected to the microcontroller 7 through a displacement sensor 18, detailed in FIG. 7 and FIG. 8. The angular displacement of the rotary wheel 3 is measured through the displacement sensor 18, including but not limited to a digital sensor, an analog sensor, or an optical sensor in order to translate the angular displacement of the rotary wheel 3 into the input signal for the computing device. The primary joystick 4 is electronically connected to the microcontroller 7 through a potentiometer 19 of the primary joystick 4. Similarly, each thumbstick of the at least one thumbstick 5 is electronically connected to the microcontroller 7 through a corresponding potentiometer for each thumbstick. Therefore, the motion of the primary joystick 4 and each of at least one thumbstick is able to be translated into an input signal for the computing device.

Figure 2:
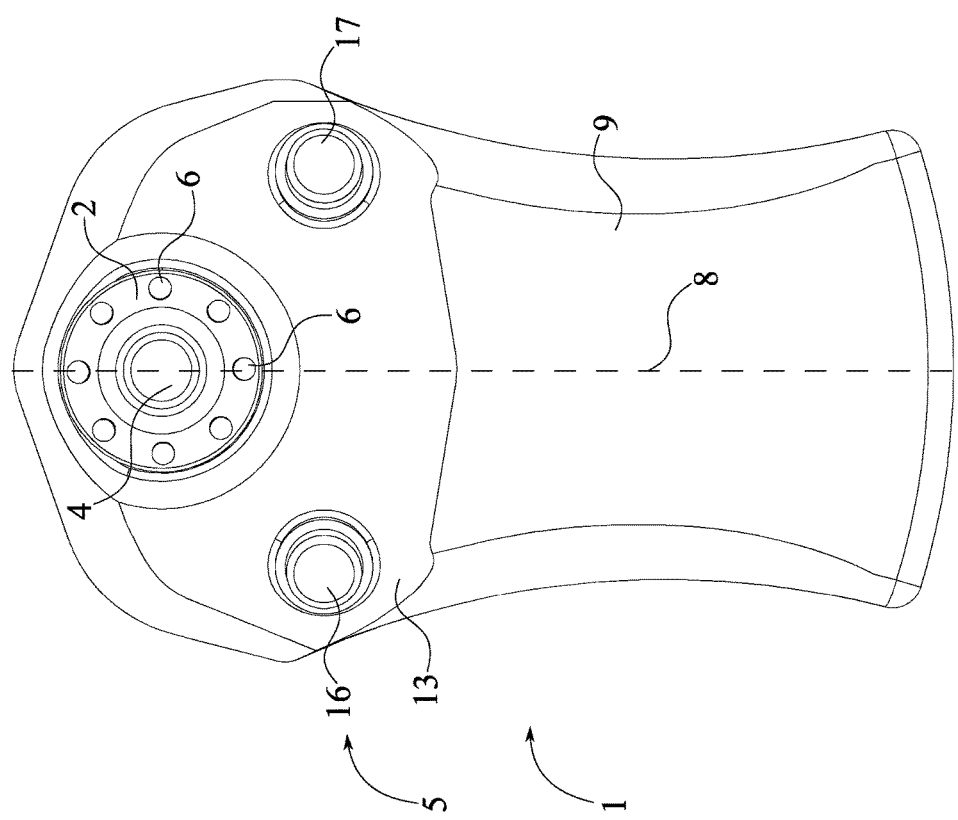
FIG. 2 is a top view of the present invention.
Figure 3:
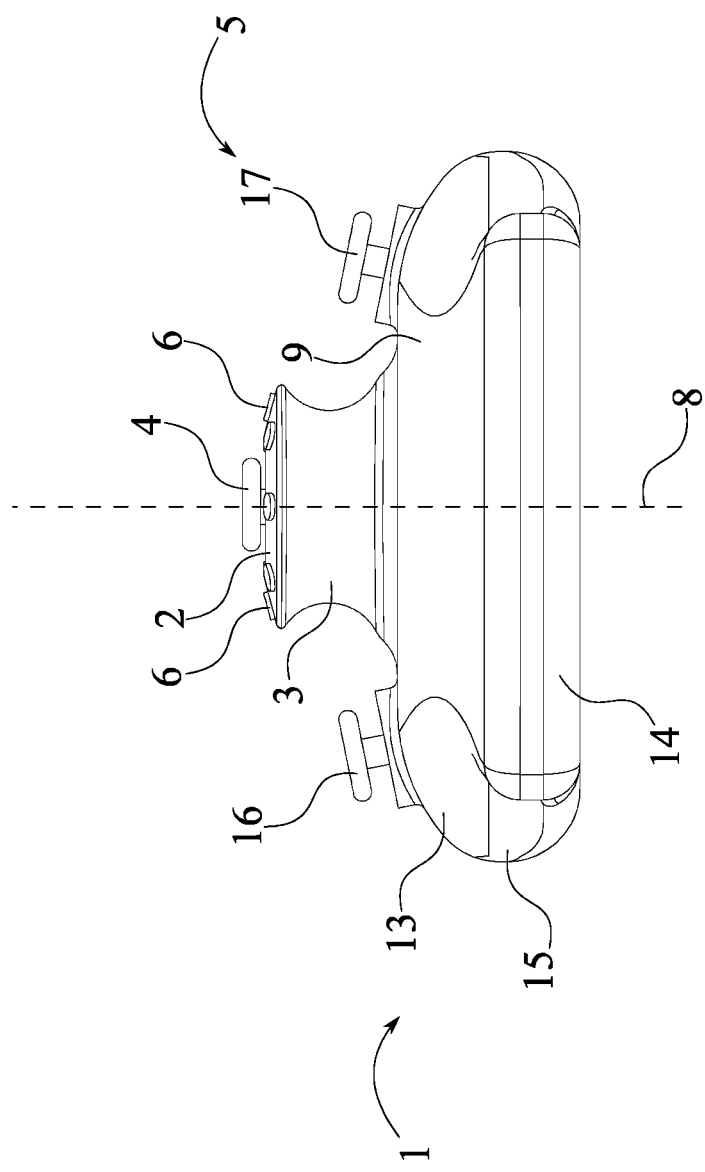
FIG. 3 is a front view of the present invention.
Figure 4:
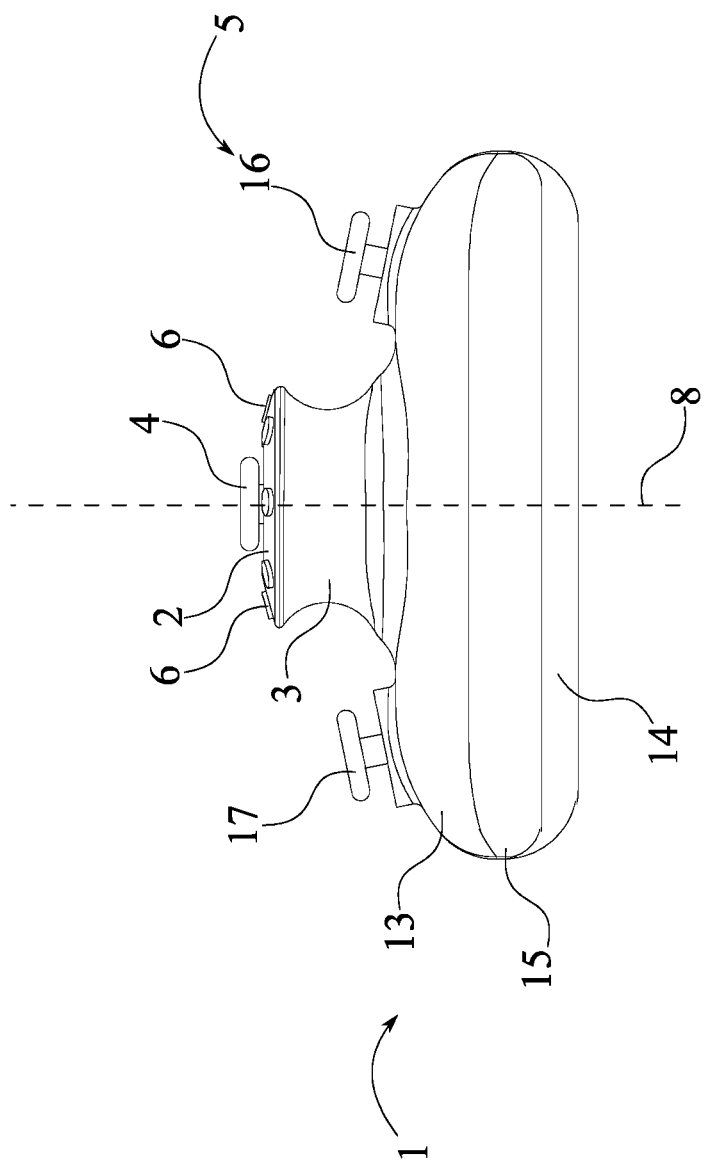
FIG. 4 is a rear view of the present invention.
Figure 5:
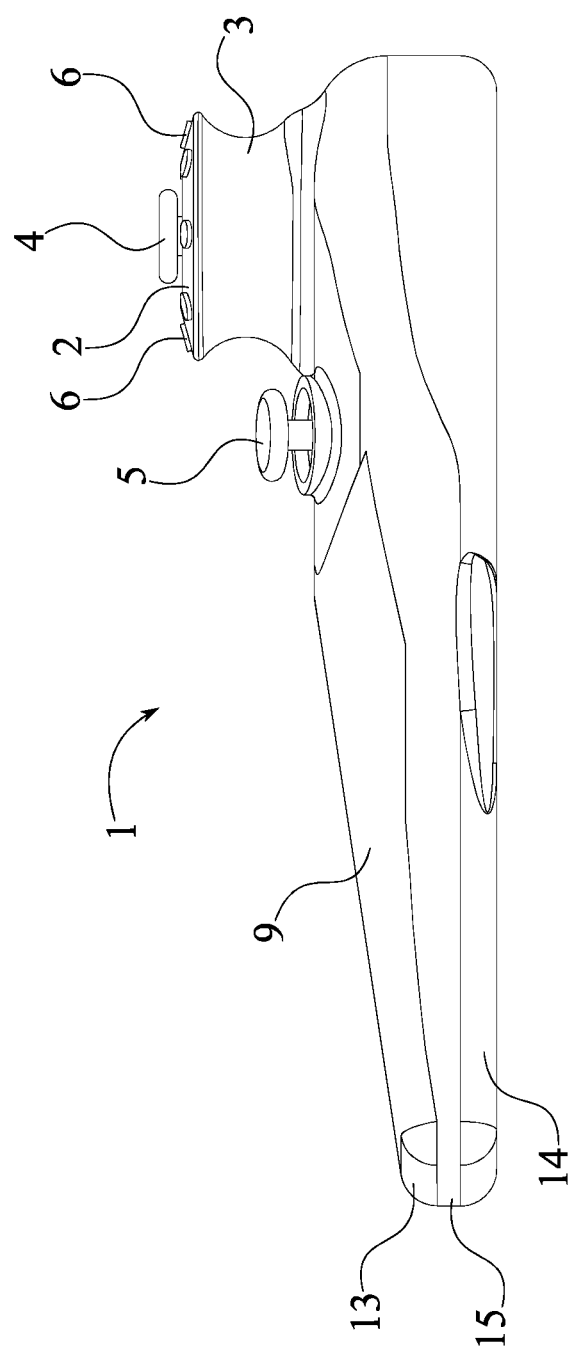
FIG. 5 is a right view of the present invention.
Figure 6:
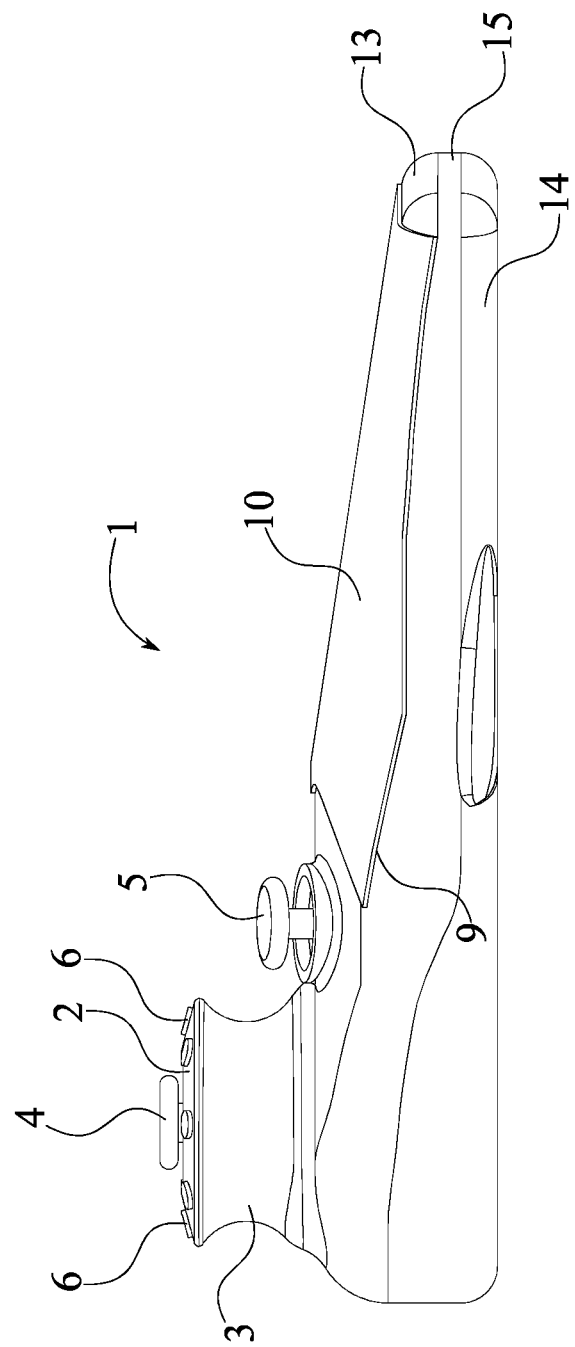
FIG. 6 is a left view of the present invention, wherein the present invention comprises a wrist pad.

In some embodiments of the present invention, the present invention comprises a sagittal plane 8, and the at least one thumbstick 5 is a first thumbstick 16 and a second thumbstick 17, detailed in FIG. 2 and FIG. 3. The sagittal plane 8 is a reference for the positioning of the first thumbstick 16 and the second thumbstick 17. The sagittal plane 8 bisects the primary joystick 4 and the protective housing 1, perpendicular to the base surface 14. The first thumbstick 16 and the second thumbstick 17 are offset from the sagittal plane 8. The first thumbstick 16 and the second thumbstick 17 are oppositely positioned to each other about the sagittal plane 8. This configuration allows the present invention to be used ambidextrously instead of exclusively the left hand or right hand.

In accordance to the preferred embodiment, the present invention comprises a wrist rest 9, shown in FIG. 1 to FIG. 3. The wrist rest 9 supports the user's wrist to prevent strain to the user's wrist while manipulating the present invention. The wrist rest 9 is adjacently connected to the interfacing surface. The wrist rest 9 being oppositely oriented to the base surface 14. The at least one thumbstick 5 is positioned between the wheel-mounting extrusion 2 and the wrist rest 9, to allow the user's wrist to be positioned on the wrist rest 9, the user's corresponding thumb manipulating the at least one thumbstick 5, and the user's remaining digits for the respective hand to manipulate the rotary wheel 3 or the primary joystick 4. For a more specific embodiment of the present invention, the present invention comprises a wrist pad 10, detailed in FIG. 6. The wrist pad 10 provides a cushion for the user's wrist supported by the wrist rest 9. The wrist pad 10 is adjacently connected to the wrist rest 9. The wrist pad 10 is oppositely positioned to the interfacing surface about the wrist rest 9 to allow the user's wrist to be supported by the wrist rest 9 through the wrist pad 10.

In some embodiments of the present invention, the present invention comprises a bus connector 11, shown in FIG. 7. The bus connector 11 engages a computer bus in order to transfer the input signal from the microcontroller 7 to the computing device. The bus connector 11 traverses through the protective housing 1. The bus connector 11 is electronically connected to the microcontroller 7. The bus connector 11 engages the computer bus to communicate the input signal from the microcontroller 7 to the computing device.

In some other embodiments of the present invention, the present invention comprises a wireless transmitter 12, detailed in FIG. 8. The wireless transmitter 12 allows the present invention to communicate with the computing device without tethering the present invention to the computing device. The wireless transmitter 12 is internally mounted to the protective housing 1. The wireless transmitter 12 is electronically connected to the microcontroller 7. In addition, the wireless transmitter 12 is communicatively coupled with the computing device through an appropriate wireless protocol, such as radio frequency, Bluetooth or Wi-Fi, in order to communicate the input signal from the microcontroller 7 to the computing device.

Although the invention has been explained in relation to its preferred embodiment, it is to be understood that many other possible modifications and variations can be made without departing from the spirit and scope of the invention as hereinafter claimed.

What is claimed is:

1. A motion control device for interfacing with a computing device comprises:
   a protective housing comprises an interface surface, a base surface, and a lateral wall;
   the interface surface being oppositely positioned with the base surface, about the lateral wall;
   a wheel-mounting extrusion being externally connected to the interface surface;
   the wheel-mounting extrusion being oriented away from the base surface;
   a rotary wheel being rotatably connected about the wheel-mounting extrusion;
   a primary joystick being pivotably and centrally connected to wheel-mounting extrusion;

the primary joystick being positioned within the wheel-mounting extrusion;
at least one thumbstick being pivotably connected to the protective housing;
the at least one thumbstick being radially offset from the rotary wheel;
a plurality of programmable buttons being pressably mounted to the wheel-mounting extrusion;
the plurality of programmable buttons being oppositely positioned to the interface surface, along the wheel mounting extrusion;
a microcontroller being internally mounted within the protective housing; and
the rotary wheel, the primary joystick, the at least one thumbstick, and the plurality of programmable buttons being electronically connected to the microcontroller.

2. The motion control device for interfacing with a computing device, as claimed in claim 1, comprises:
the plurality of programmable buttons being evenly distributed about the wheel-mounting extrusion.

3. The motion control device for interfacing with a computing device, as claimed in claim 1, comprises:
the at least one thumbstick being a first thumbstick and a second thumbstick;
the first thumbstick and the second thumbstick being offset from a sagittal plane; and
the first thumbstick and the second thumbstick being oppositely positioned to each other about the sagittal plane.

4. The motion control device for interfacing with a computing device, as claimed in claim 1, comprises:
a wrist rest being adjacently connected to the interfacing surface; and
the wrist rest being oppositely oriented to the base surface.

5. The motion control device for interfacing with a computing device, as claimed in claim 4, comprises:
the at least one thumbstick being positioned between the wheel-mounting extrusion and the wrist rest.

6. The motion control device for interfacing with a computing device, as claimed in claim 1, comprises:
a wrist pad being adjacently connected to the wrist rest; and
the wrist pad being oppositely positioned to the interfacing surface about the wrist rest.

7. The motion control device for interfacing with a computing device, as claimed in claim 1, comprises:
a bus connector traversing through the protective housing; and
the bus connector being electronically connected to the microcontroller.

8. The motion control device for interfacing with a computing device, as claimed in claim 1, comprises:
a wireless transmitter being internally mounted to the protective housing; and
the wireless transmitter being electronically connected to the microcontroller.

9. The motion control device for interfacing with a computing device, as claimed in claim 1, comprises:
the rotary wheel being electronically connected to the microcontroller through a displacement sensor.

10. The motion control device for interfacing with a computing device, as claimed in claim 1, comprises:
the primary being electronically connected to the microcontroller through a potentiometer of the primary joystick.

11. The motion control device for interfacing with a computing device, as claimed in claim 1, comprises:
each thumbstick of the at least one thumbstick being electronically connected to the microcontroller through a corresponding potentiometer for each thumbstick.

12. The motion control device for interfacing with a computing device, as claimed in claim 1, comprises:
the primary joystick being oppositely oriented to the base surface.

13. The motion control device for interfacing with a computing device, as claimed in claim 1, comprises:
the at least one thumbstick being oriented away from the base surface.

14. The motion control device for interfacing with a computing device, as claimed in claim 1, comprises:
the at least one thumbstick traversing though the interface surface.

* * * * *